(12) United States Patent
Jayaram et al.

(10) Patent No.: US 10,397,364 B2
(45) Date of Patent: *Aug. 27, 2019

(54) SKILLS ENDORSEMENTS

(71) Applicant: Microsoft Technology Licensing, LLC, Redmond, WA (US)

(72) Inventors: Vinodh Jayaram, Fremont, CA (US); Peter N. Skomoroch, San Francisco, CA (US); Matthew T Hayes, Milpitas, CA (US); Adam Nash, Los Altos, CA (US); David Michael Breger, San Francisco, CA (US); Prachi Gupta, San Mateo, CA (US); Elliot Shmukler, Palo Alto, CA (US); Avery Randolph Moon, Redwood Shores, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/015,497

(22) Filed: Jun. 22, 2018

(65) Prior Publication Data
US 2018/0332135 A1  Nov. 15, 2018

Related U.S. Application Data

(63) Continuation of application No. 15/441,529, filed on Feb. 24, 2017, now Pat. No. 10,027,778, which is a
(Continued)

(51) Int. Cl.
*H04L 29/08* (2006.01)
*G06Q 10/06* (2012.01)
(Continued)

(52) U.S. Cl.
CPC .......... *H04L 67/306* (2013.01); *G06F 16/334* (2019.01); *G06F 16/337* (2019.01);
(Continued)

(58) Field of Classification Search
CPC .................................................... H04L 67/306
See application file for complete search history.

(56) References Cited

U.S. PATENT DOCUMENTS 6,289,340 B1  9/2001  Puram et al.
6,594,673 B1  7/2003  Smith et al.
(Continued)

FOREIGN PATENT DOCUMENTS

AU  2015202075 A1  5/2015
CN  101496051 A  7/2009
(Continued)

OTHER PUBLICATIONS

"U.S. Appl. No. 13/357,171, Non Final Office Action dated Jun. 17, 2013", 9 pgs.
(Continued)

*Primary Examiner* — Ramy M Osman
(74) *Attorney, Agent, or Firm* — Schwegman Lundberg & Woessner, P.A.

(57) ABSTRACT

Disclosed in some examples is a method comprising determining a first set of high ranking skills, the first set containing skills possessed by a member of the social networking service based upon the member's user profile; determining a second set of high ranking skills, the second set containing skills for a second member of the social networking service based on the second member's user profile; determining a third set of high ranking skills, the third set being the intersection between the first and second set of high ranking skills; and suggesting one or more of the skills in the third set of high ranking skills to the member for endorsement of the second member with respect to that skill.

21 Claims, 6 Drawing Sheets

Related U.S. Application Data continuation of application No. 13/672,377, filed on Nov. 8, 2012, now Pat. No. 9,654,592.

(51) Int. Cl.
  *G06Q 30/02* (2012.01)
  *G06F 16/33* (2019.01)
  *G06F 16/335* (2019.01)
  *G06Q 50/00* (2012.01)
  *G06Q 10/10* (2012.01)

(52) U.S. Cl.
  CPC ....... *G06Q 10/06398* (2013.01); *G06Q 10/10* (2013.01); *G06Q 30/02* (2013.01); *G06Q 50/01* (2013.01); *H04L 67/10* (2013.01); *H04L 67/30* (2013.01)

(56) References Cited

U.S. PATENT DOCUMENTS

| Patent/Pub No. | Date | Name |
|---|---|---|
| 6,675,159 B1 | 1/2004 | Lin et al. |
| 7,310,676 B2 | 12/2007 | Bourne |
| 7,478,078 B2 | 1/2009 | Lunt et al. |
| 7,512,612 B1 | 3/2009 | Akella et al. |
| 7,539,697 B1 | 5/2009 | Akella |
| 7,593,740 B2 | 9/2009 | Crowley et al. |
| 7,945,522 B2 | 5/2011 | Mcgovern et al. |
| 7,945,862 B2 | 5/2011 | Aldrich et al. |
| 8,036,931 B2 | 10/2011 | Hale et al. |
| 8,060,451 B2 | 11/2011 | Degeratu et al. |
| 8,224,756 B2 | 7/2012 | Roberts et al. |
| 8,402,040 B2 | 3/2013 | Mallalieu et al. |
| 8,412,564 B1 | 4/2013 | Thell et al. |
| 8,494,914 B2 | 7/2013 | Mesaros |
| 8,650,177 B2 | 2/2014 | Skomoroch et al. |
| 8,661,034 B2 | 2/2014 | Polonsky et al. |
| 8,825,785 B2 | 9/2014 | Shah et al. |
| 8,935,263 B1 | 1/2015 | Rodriguez et al. |
| 8,938,690 B1 | 1/2015 | Khouri et al. |
| 9,087,321 B2 | 7/2015 | Neal et al. |
| 9,135,573 B1 | 9/2015 | Rodriguez et al. |
| 9,137,323 B2 | 9/2015 | Shah et al. |
| 9,225,788 B2 | 12/2015 | Naveh et al. |
| 9,251,470 B2 | 2/2016 | Hua et al. |
| 9,473,583 B2 * | 10/2016 | Allen ................. H04L 67/306 |
| 9,536,439 B1 | 1/2017 | Goldstein et al. |
| 9,654,592 B2 | 5/2017 | Jayaram et al. |
| 9,697,472 B2 | 7/2017 | Burgess et al. |
| 9,971,993 B2 | 5/2018 | Cheng et al. |
| 10,027,778 B2 | 7/2018 | Jayaram et al. |
| 10,083,295 B2 * | 9/2018 | Spurlock ............. H04L 63/1441 |
| 2001/0032244 A1 | 10/2001 | Neustel |
| 2002/0181685 A1 | 12/2002 | Doherty et al. |
| 2003/0128236 A1 | 7/2003 | Chen |
| 2003/0187809 A1 | 10/2003 | Suermondt et al. |
| 2003/0187813 A1 | 10/2003 | Goldman et al. |
| 2004/0010443 A1 | 1/2004 | May et al. |
| 2004/0117617 A1 | 6/2004 | Geller et al. |
| 2005/0015432 A1 | 1/2005 | Cohen |
| 2005/0055450 A1 | 3/2005 | Gang |
| 2005/0130110 A1 | 6/2005 | Gosling |
| 2005/0159970 A1 | 7/2005 | Buyukkokten et al. |
| 2005/0165594 A1 | 7/2005 | Chandra et al. |
| 2005/0278325 A1 | 12/2005 | Mihalcea et al. |
| 2006/0004716 A1 | 1/2006 | Hurst-Hiller et al. |
| 2006/0042483 A1 | 3/2006 | Work et al. |
| 2006/0136419 A1 | 6/2006 | Brydon et al. |
| 2006/0184464 A1 | 8/2006 | Tseng et al. |
| 2006/0218111 A1 | 9/2006 | Cohen |
| 2006/0229896 A1 | 10/2006 | Rosen et al. |
| 2006/0242014 A1 | 10/2006 | Marshall et al. |
| 2006/0287970 A1 | 12/2006 | Chess et al. |
| 2007/0106780 A1 | 5/2007 | Farnham et al. |
| 2007/0202475 A1 | 8/2007 | Habichler et al. |
| 2008/0005072 A1 | 1/2008 | Meek et al. |
| 2008/0065481 A1 | 3/2008 | Immorlica et al. |
| 2008/0077461 A1 | 3/2008 | Glick |
| 2008/0140680 A1 | 6/2008 | Hyder et al. |
| 2008/0162274 A1 | 7/2008 | Newman |
| 2008/0172415 A1 | 7/2008 | Fakhari et al. |
| 2008/0208907 A1 | 8/2008 | Tolve et al. |
| 2008/0243628 A1 | 10/2008 | Wiseman et al. |
| 2008/0288612 A1 | 11/2008 | Kwon |
| 2008/0294589 A1 | 11/2008 | Chu et al. |
| 2008/0313000 A1 | 12/2008 | Degeratu et al. |
| 2009/0006193 A1 | 1/2009 | Forbes et al. |
| 2009/0027392 A1 | 1/2009 | Jadhav et al. |
| 2009/0112796 A1 | 4/2009 | Elder |
| 2009/0112995 A1 | 4/2009 | Addae et al. |
| 2009/0157677 A1 | 6/2009 | Beaver et al. |
| 2009/0193037 A1 | 7/2009 | Yu et al. |
| 2009/0222303 A1 | 9/2009 | Higgins et al. |
| 2009/0228294 A1 * | 9/2009 | Choi ................. G06Q 30/018 705/317 |
| 2009/0228830 A1 | 9/2009 | Herz et al. |
| 2009/0282107 A1 | 11/2009 | O'sullivan et al. |
| 2009/0299990 A1 | 12/2009 | Setlur et al. |
| 2010/0036934 A1 | 2/2010 | Bruster |
| 2010/0057597 A1 | 3/2010 | Vilrokx |
| 2010/0076989 A1 | 3/2010 | Jakobson |
| 2010/0082427 A1 | 4/2010 | Burgener et al. |
| 2010/0094879 A1 | 4/2010 | Donnelly et al. |
| 2010/0161369 A1 | 6/2010 | Farrell et al. |
| 2010/0169364 A1 | 7/2010 | Hardt |
| 2010/0293247 A1 | 11/2010 | Mckee et al. |
| 2010/0318613 A1 | 12/2010 | Souza et al. |
| 2011/0040586 A1 | 2/2011 | Murray et al. |
| 2011/0072052 A1 | 3/2011 | Skarin et al. |
| 2011/0078188 A1 | 3/2011 | Li et al. |
| 2011/0161129 A1 | 6/2011 | Barsoba et al. |
| 2011/0177483 A1 | 7/2011 | Needham et al. |
| 2011/0191337 A1 | 8/2011 | Cort et al. |
| 2011/0196924 A1 | 8/2011 | Hargarten et al. |
| 2011/0209068 A1 | 8/2011 | Vemuri |
| 2011/0213785 A1 | 9/2011 | Kristiansson et al. |
| 2011/0238591 A1 | 9/2011 | Kerr et al. |
| 2011/0258042 A1 | 10/2011 | Purvy et al. |
| 2011/0288851 A1 | 11/2011 | Duan |
| 2011/0302159 A1 | 12/2011 | Mikesell et al. |
| 2012/0023030 A1 | 1/2012 | Jeffries |
| 2012/0095933 A1 | 4/2012 | Goldberg |
| 2012/0096002 A1 | 4/2012 | Sheehan et al. |
| 2012/0110071 A1 | 5/2012 | Zhou et al. |
| 2012/0117036 A1 | 5/2012 | Lester et al. |
| 2012/0166535 A1 | 6/2012 | Deng et al. |
| 2012/0197733 A1 | 8/2012 | Skomoroch et al. |
| 2012/0197863 A1 | 8/2012 | Skomoroch et al. |
| 2012/0197906 A1 | 8/2012 | Landau et al. |
| 2012/0197993 A1 | 8/2012 | Skomoroch et al. |
| 2012/0226623 A1 | 9/2012 | Jurney et al. |
| 2012/0233197 A1 | 9/2012 | Tsai et al. |
| 2012/0259791 A1 | 10/2012 | Zoidze |
| 2012/0284282 A9 * | 11/2012 | Ghosh ................. G06Q 30/02 707/748 |
| 2012/0310927 A1 | 12/2012 | Johnson et al. |
| 2012/0311462 A1 | 12/2012 | Devecka |
| 2013/0013489 A1 | 1/2013 | Kremen et al. |
| 2013/0013526 A1 | 1/2013 | Le Viet et al. |
| 2013/0091071 A1 | 4/2013 | Davies |
| 2013/0124268 A1 | 5/2013 | Hatton et al. |
| 2013/0159325 A1 | 6/2013 | Polonsky et al. |
| 2013/0212032 A1 | 8/2013 | Cox et al. |
| 2013/0218965 A1 | 8/2013 | Abrol et al. |
| 2013/0254213 A1 | 9/2013 | Cheng et al. |
| 2013/0254303 A1 | 9/2013 | Cheng et al. |
| 2013/0254305 A1 | 9/2013 | Cheng et al. |
| 2013/0282811 A1 | 10/2013 | Lessin et al. |
| 2014/0025427 A1 | 1/2014 | Bastian et al. |
| 2014/0081928 A1 | 3/2014 | Skomoroch et al. |
| 2014/0129631 A1 | 5/2014 | Jayaram et al. |
| 2014/0143324 A1 | 5/2014 | Lessin |
| 2014/0164512 A1 | 6/2014 | Allen et al. |
| 2014/0164952 A1 | 6/2014 | Allen et al. |
| 2014/0181193 A1 | 6/2014 | Narasimhan et al. |

(56) References Cited

U.S. PATENT DOCUMENTS

| | | | |
|---|---|---|---|
| 2014/0279017 | A1 | 9/2014 | Levi et al. |
| 2014/0279722 | A1 | 9/2014 | Singh et al. |
| 2014/0358607 | A1 | 12/2014 | Gupta et al. |
| 2015/0026120 | A1 | 1/2015 | Chrapko et al. |
| 2015/0088793 | A1 | 3/2015 | Burgess et al. |
| 2015/0142767 | A1 | 5/2015 | Wu et al. |
| 2015/0347917 | A1 | 12/2015 | Hua et al. |
| 2016/0098644 | A1 | 4/2016 | Hua et al. |
| 2017/0004587 | A1 | 1/2017 | Pruett et al. |
| 2017/0161668 | A1 | 6/2017 | Jayaram et al. |
| 2017/0220955 | A1 | 8/2017 | Burgess et al. |

FOREIGN PATENT DOCUMENTS

| | | |
|---|---|---|
| CN | 102117325 A | 7/2011 |
| CN | 102132314 A | 7/2011 |
| CN | 102156910 A | 8/2011 |
| CN | 102332000 A | 1/2012 |
| CN | 102333112 A | 1/2012 |
| CN | 103502975 A | 1/2014 |
| CN | 104885100 A | 9/2015 |
| CN | 103502975 B | 12/2017 |
| DE | 212013000002 U1 | 9/2013 |
| DE | 202013012168 U1 | 10/2015 |
| EP | 2673718 B1 | 11/2016 |
| IN | 4783DELNP2015 A | 11/2015 |
| JP | 2009134520 A | 6/2009 |
| WO | WO-2013131108 A1 | 9/2013 |
| WO | WO-2014074607 A2 | 5/2014 |
| WO | WO-2014074607 A3 | 5/2014 |
| WO | WO-2015183376 A1 | 12/2015 |

OTHER PUBLICATIONS

"U.S. Appl. No. 13/357,171, Notice of Allowance dated Oct. 1, 2013", 10 pgs.
"U.S. Appl. No. 13/357,171, Response filed Sep. 17, 2013 to Non Final Office Action dated Jun. 17, 2013", 12 pgs.
"U.S. Appl. No. 13/357,302, Examiner Interview Summary dated Mar. 17, 2016", 3 pgs.
"U.S. Appl. No. 13/357,302, Final Office Action dated May 3, 2017", 45 pgs.
"U.S. Appl. No. 13/357,302, Final Office Action dated Nov. 9, 2015", 44 pgs.
"U.S. Appl. No. 13/357,302, Non Final Office Action dated Mar. 4, 2015", 28 pgs.
"U.S. Appl. No. 13/357,302, Non Final Office Action dated Sep. 7, 2016", 46 pgs.
"U.S. Appl. No. 13/357,302, Response filed Feb. 7, 2017 to Non Final Office Action dated Sep. 7, 2016", 17 pgs.
"U.S. Appl. No. 13/357,302, Response filed Mar. 9, 2016 to Final Office Action dated Nov. 9, 2015", 16 pgs.
"U.S. Appl. No. 13/357,302, Response filed Aug. 4, 2015 to Non Final Office Action dated Mar. 4, 2015", 25 pgs.
"U.S. Appl. No. 13/357,360, Advisory Action dated Apr. 13, 2017", 3 pgs.
"U.S. Appl. No. 13/357,360, Examiner Interview Summary dated Feb. 7, 2018", 3 pgs.
"U.S. Appl. No. 13/357,360, Final Office Action dated Feb. 2, 2017", 30 pgs.
"U.S. Appl. No. 13/357,360, Final Office Action dated Mar. 27, 2018", 14 pgs.
"U.S. Appl. No. 13/357,360, Final Office Action dated Jun. 27, 2013", 22 pgs.
"U.S. Appl. No. 13/357,360, Non Final Office Action dated Jul. 14, 2016", 28 pgs.
"U.S. Appl. No. 13/357,360, Non Final Office Action dated Oct. 6, 2017", 10 pgs.
"U.S. Appl. No. 13/357,360, Non Final Office Action dated Oct. 11, 2012", 13 pgs.
"U.S. Appl. No. 13/357,360, Response filed Feb. 6, 2018 to Non Final Office Action dated Oct. 6, 2017", 15 pgs.
"U.S. Appl. No. 13/357,360, Response filed Mar. 18, 2013 to Non Final Office Action dated Oct. 11, 2012", 17 pgs.
"U.S. Appl. No. 13/357,360, Response filed Apr. 3, 2017 to Final Office Action dated Feb. 2, 2017", 16 pgs.
"U.S. Appl. No. 13/357,360, Response filed Oct. 14, 2016 to Non Final Office Action dated Jul. 14, 2016", 27 pgs.
"U.S. Appl. No. 13/357,360, Response filed Nov. 20, 2013 to Final Office Action dated Jun. 27, 2013", 18 pgs.
"U.S. Appl. No. 13/430,284, Examiner interview Summary dated Nov. 7, 2017", 3 pgs.
"U.S. Appl. No. 13/430,284, Final Office Action dated Mar. 6, 2017", 33 pgs.
"U.S. Appl. No. 13/430,284, Final Office Action dated Aug. 13, 2015", 23 pgs.
"U.S. Appl. No. 13/430,284, Non Final Office Action dated Jul. 18, 2016", 31 pgs.
"U.S. Appl. No. 13/430,284, Non Final Office Action dated Aug. 11, 2017", 32 pgs.
"U.S. Appl. No. 13/430,284, Non Final Office Action dated Oct. 23, 2014", 19 pgs.
"U.S. Appl. No. 13/430,284, Notice of Allowance dated Jan. 19, 2018", 11 pgs.
"U.S. Appl. No. 13/430,284, Response filed Feb. 15, 2016 to Final Office Action dated Aug. 13, 2015", 12 pgs.
"U.S. Appl. No. 13/430,284, Response filed Apr. 23, 2015 to Non Final Office Action dated Oct. 23, 2014", 10 pgs.
"U.S. Appl. No. 13/430,284, Response filed Jul. 6, 2017 to Final Office Action dated Mar. 6, 2017", 15 pgs.
"U.S. Appl. No. 13/430,284, Response filed Nov. 18, 2016 to Non Final Office Action dated Jul. 18, 2016", 19 pgs.
"U.S. Appl. No. 13/430,284, Response filed Dec. 14, 2017 to Non Final Office Action dated Aug. 11, 2017", 14 pgs.
"U.S. Appl. No. 13/482,884, Examiner Interview Summary dated Nov. 17, 2017", 3 pgs.
"U.S. Appl. No. 13/482,884, Final Office Action dated Feb. 6, 2014", 19 pgs.
"U.S. Appl. No. 13/482,884, Final Office Action dated May 19, 2016", 30 pgs.
"U.S. Appl. No. 13/482,884, Non Final Office Action dated Jul. 15, 2013", 19 pgs.
"U.S. Appl. No. 13/482,884, Non Final Office Action dated Jul. 16, 2015", 26 pgs.
"U.S. Appl. No. 13/482,884, Non Final Office Action dated Aug. 25, 2017", 31 pgs.
"U.S. Appl. No. 13/482,884, Non Final Office Action dated Oct. 3, 2012", 19 pgs.
"U.S. Appl. No. 13/482,884, Non Final Office Action dated Nov. 19, 2014", 23 pgs.
"U.S. Appl. No. 13/482,884, Response filed Jan. 2, 2013 to Non Final Office Action dated Oct. 3, 2012", 11 pgs.
"U.S. Appl. No. 13/482,884, Response filed Jan. 19, 2016 to Non Final Office Action dated Jul. 16, 2015", 18 pgs.
"U.S. Appl. No. 13/482,884, Response filed Jan. 25, 2018 to Non Final Office Action dated Aug. 25, 2017", 13 pgs.
"U.S. Appl. No. 13/482,884, Response filed Mar. 19, 2015 to Non Final Office Action dated Nov. 19, 2014", 25 pgs.
"U.S. Appl. No. 13/482,884, Response filed Jul. 7, 2014 to Final Office Action dated Feb. 6, 2014", 12 pgs.
"U.S. Appl. No. 13/482,884, Response filed Oct. 15, 2013 to Non Final Office Action dated Jul. 15, 2013", 11 pgs.
"U.S. Appl. No. 13/482,884, Response filed Oct. 19, 2016 to Final Office Action dated May 19, 2016", 15 pgs.
"U.S. Appl. No. 13/548,957, Final Office Action dated Mar. 24, 2017", 32 pgs.
"U.S. Appl. No. 13/548,957, Final Office Action dated Apr. 5, 2016", 25 pgs.
"U.S. Appl. No. 13/548,957, Non Final Office Action dated Jun. 18, 2015", 20 pgs.
"U.S. Appl. No. 13/548,957, Non Final Office Action dated Jul. 25, 2016", 33 pgs.

(56) References Cited

OTHER PUBLICATIONS

"U.S. Appl. No. 13/548,957, Response filed Jun. 27, 2016 to Final Office Action dated Apr. 5, 2016", 16 pgs.
"U.S. Appl. No. 13/548,957, Response filed Dec. 27, 2016 to Non Final Office Action dated Jul. 25, 2016", 19 pgs.
"U.S. Appl. No. 13/548,957, Response filed Dec. 18, 2015 to Non Final Office Action dated Jun. 18, 2015", 13 pgs.
"U.S. Appl. No. 13/629,241, Examiner Interview Summary dated Jan. 29, 2018", 3 pgs.
"U.S. Appl. No. 13/629,241, Final Office Action dated Mar. 9, 2018", 40 pgs.
"U.S. Appl. No. 13/629,241, Final Office Action dated Mar. 27, 2015", 24 pgs.
"U.S. Appl. No. 13/629,241, Final Office Action dated Apr. 22, 2016", 29 pgs.
"U.S. Appl. No. 13/629,241, Non Final Office Action dated Sep. 25, 2015", 25 pgs.
"U.S. Appl. No. 13/629,241, Non Final Office Action dated Oct. 27, 2017", 42 pgs.
"U.S. Appl. No. 13/629,241, Non Final Office Action dated Nov. 3, 2014", 28 pgs.
"U.S. Appl. No. 13/629,241, Response filed Jan. 25, 2016 to Non-Final Office Action dated Sep. 25, 2015", 12 pgs.
"U.S. Appl. No. 13/629,241, Response filed Jan. 29, 2018 to Non Final Office Action dated Oct. 27, 2017", 19 pgs.
"U.S. Appl. No. 13/629,241, Response filed Mar. 3, 2015 to Non-Final Office Action dated Nov. 3, 2014", 22 pgs.
"U.S. Appl. No. 13/629,241, Response filed Jun. 29, 2015 to Final Office Action dated Mar. 27, 2015", 15 pgs.
"U.S. Appl. No. 13/629,241, Response filed Sep. 22, 2016 to Final Office Action dated Apr. 22, 2016", 20 pgs.
"U.S. Appl. No. 13/672,377, Advisory Action dated Nov. 25, 2016", 4 pgs.
"U.S. Appl. No. 13/672,377, Corrected Notice of Allowance dated Feb. 7, 2017", 2 pgs.
"U.S. Appl. No. 13/672,377, Final Office Action dated Jul. 2, 2015", 8 pgs.
"U.S. Appl. No. 13/672,377, Final Office Action dated Aug. 18, 2016", 12 pgs.
"U.S. Appl. No. 13/672,377, Non Final Office Action dated Feb. 26, 2016", 12 pgs.
"U.S. Appl. No. 13/672,377, Non Final Office Action dated Dec. 4, 2014", 9 pgs.
"U.S. Appl. No. 13/672,377, Notice of Allowance dated Jan. 17, 2017", 6 pgs.
"U.S. Appl. No. 13/672,377, Response filed Apr. 6, 2015 to Non Final Office Action dated Dec. 4, 2014", 13 pgs.
"U.S. Appl. No. 13/672,377, Response filed Jul. 26, 2016 to Non Final Office Action dated Feb. 26, 2016", 11 pgs.
"U.S. Appl. No. 13/672,377, Response filed Oct. 18, 2016 to Final Office Action dated Aug. 18, 2016", 13 pgs.
"U.S. Appl. No. 13/672,377, Response filed Dec. 17, 2015 to Final Office Action dated Jul. 2, 2015", 12 pgs.
"U.S. Appl. No. 13/672,377, Response filed Dec. 19, 2016 to Advisory Action dated Nov. 25, 2016", 14 pgs.
"U.S. Appl. No. 13/710,248, Final Office Action dated Mar. 30, 2015", 23 pgs.
"U.S. Appl. No. 13/710,248, Non Final Office Action dated Nov. 17, 2014", 21 pgs.
"U.S. Appl. No. 13/710,248, Response dated Mar. 17, 2015 to Non Final Office Action dated Nov. 17, 2014", 14 pgs.
"U.S. Appl. No. 13/716,003, Non Final Office Action dated Dec. 19, 2014", 13 pgs.
"U.S. Appl. No. 13/716,003, Response filed Apr. 20, 2015 to Non Final Office Action dated Dec. 19, 2014", 11 PGS.
"U.S. Appl. No. 14/072,955 Appeal Brief filed Sep. 15, 2016", 36 pgs.
"U.S. Appl. No. 14/072,955, Appeal Decision mailed Dec. 28, 2017", 6 psg.
"U.S. Appl. No. 14/072,955, Examiner Interview Summary dated Mar. 30, 2015", 3 pgs.
"U.S. Appl. No. 14/072,955, Examiner's Answer dated Feb. 10, 2017", 7 pgs.
"U.S. Appl. No. 14/072,955, Final Office Action dated Jan. 15, 2016", 12 pgs.
"U.S. Appl. No. 14/072,955, Final Office Action dated Mar. 22, 2018", 7 pgs.
"U.S. Appl. No. 14/072,955, Final Office Action dated Nov. 12, 2014", 11 pgs.
"U.S. Appl. No. 14/072,955, Non Final Office Action dated May 9, 2014", 11 pgs.
"U.S. Appl. No. 14/072,955, Non Final Office Action dated May 29, 2015", 12 pgs.
"U.S. Appl. No. 14/072,955, Notice of Allowance dated Jul. 5, 2018", 8 pgs.
"U.S. Appl. No. 14/072,955, Notice of Non-Compliant Appeal Brief mailed Oct. 6, 2016", 2 pgs.
"U.S. Appl. No. 14/072,955, Preliminary Amendment filed Dec. 10, 2013", 10 pgs.
"U.S. Appl. No. 14/072,955, Reply Brief filed Apr. 10, 2017", 9 pgs.
"U.S. Appl. No. 14/072,955, Response filed Apr. 13, 2015 to Final Office Action dated Nov. 12, 2014", 13 pgs.
"U.S. Appl. No. 14/072,955, Response filed Jun. 19, 2018 to Final Office Action dated Mar. 22, 2018", 11 pgs.
"U.S. Appl. No. 14/072,955, Response filed Aug. 11, 2014 to Non Final Office Action dated May 9, 2014", 14 pgs.
"U.S. Appl. No. 14/072,955, Response filed Jan. 12, 2018 to Final Office Action dated Jan. 15, 2016", 11 pgs.
"U.S. Appl. No. 14/072,955, Response filed Oct. 18, 2016 to Notice of Non-Compliant Appeal Brief mailed Oct. 6, 2016", 9 pgs.
"U.S. Appl. No. 14/072,955, Response filed Oct. 29, 2015 to Non Final Office Action dated May 29, 2015", 15 pgs.
"U.S. Appl. No. 14/292,779, 312 Amendment filed Nov. 30, 2015", 4 pgs.
"U.S. Appl. No. 14/292,779, Final Office Action dated Jun. 5, 2015", 24 pgs.
"U.S. Appl. No. 14/292,779, Non Final Office Action dated Oct. 29, 2014", 22 pgs.
"U.S. Appl. No. 14/292,779, Notice of Allowance dated Oct. 13, 2015", 18 pgs.
"U.S. Appl. No. 14/292,779, PTO Response to Rule 312 Communication dated Jan. 5, 2016", 2 pgs.
"U.S. Appl. No. 14/292,779, Response filed Jan. 29, 2015 to Non Final Office Action dated Oct. 29, 2014", 12 pgs.
"U.S. Appl. No. 14/292,779, Response filed Sep. 8, 2015 to Final Office Action dated Jun. 5, 2015", 12 pgs.
"U.S. Appl. No. 14/296,258, Non Final Office Action dated Jul. 15, 2016", 10 pgs.
"U.S. Appl. No. 14/296,258, Notice of Allowance dated Mar. 1, 2017", 5 pgs.
"U.S. Appl. No. 14/296,258, Response filed Nov. 15, 2016 to Non Final Office Action dated Jul. 15, 2016", 6 pgs.
"U.S. Appl. No. 14/788,440, Examiner Interview Summary dated Dec. 30, 2015", 3 pgs.
"U.S. Appl. No. 14/788,440, Final Office Action dated May 6, 2016", 18 pgs.
"U.S. Appl. No. 14/788,440, Final Office Action dated Sep. 8, 2017", 23 pgs.
"U.S. Appl. No. 14/788,440, Non Final Office Action dated Feb. 2, 2017", 19 pgs.
"U.S. Appl. No. 14/788,440, Non-Final Office Action received", 11 pgs.
"U.S. Appl. No. 14/788,440, Response filed Jun. 1, 2017 to Non Final Office Action dated Feb. 2, 2017", 17 pgs.
"U.S. Appl. No. 14/788,440, Response filed Dec. 22, 2015 to Non-Final Office Action dated Sep. 24, 2015", 12 pgs.
"U.S. Appl. No. 14/965,712, Preliminary Amendment filed Mar. 15, 2016", 7 pgs.
"U.S. Appl. No. 15/441,529, Non Final Office Action dated Nov. 17, 2017", 7 pgs.
"U.S. Appl. No. 15/441,529, Notice of Allowability dated Apr. 4, 2018", 2 pgs.

(56) References Cited

OTHER PUBLICATIONS

"U.S. Appl. No. 15/441,529, Notice of Allowance dated Mar. 19, 2018", 6 pgs.

"U.S. Appl. No. 15/441,529, Response filed Feb. 2, 2018 to Non Final Office Action dated Nov. 17, 2017", 8 pgs.

"U.S. Appl. No. 15/487,745, Preliminary Amendment filed Apr. 14, 2017", 8 pgs.

"U.S. Appl. No. 14/788,440, Response filed Aug. 8, 2016 to Final Office Action dated May 6, 2016", 10 pgs.

"Chinese Application Serial No. 201380000431.1, Office Action dated Mar. 2, 2016", W/ English Translation, 21 pgs.

"Chinese Application Serial No. 201380000431.1, Office Action dated May 5, 2017", with English translation of claims, 7 pgs.

"Chinese Application Serial No. 201380000431.1, Office Action dated Nov. 16, 2016", with English translation of claims, 8 pgs.

"Chinese Application Serial No. 201380000431.1, Response filed Feb. 1, 2017 to Office Action dated Nov. 16, 2016", (English Translation of Claims), 11 pgs.

"Chinese Application Serial No. 201380000431.1, Response filed Jul. 19, 2016 to Office Action dated Mar. 2, 2016", (English Translation of Claims), 19 pgs.

"Chinese Application Serial No. 201380000431.1, Response filed Jul. 20, 2017 to Office Action dated May 5, 2017", with English translation of claims, 11 pgs.

"Chinese Application Serial No. 201380069898.1, Office Action dated Jun. 8, 2018", with English translation of claims, 7 pgs.

"Chinese Application Serial No. 201380069898.1, Office Action dated Jun. 29, 2017", with English translation of claims, 20 pgs.

"Chinese Application Serial No. 201380069898.1, Response filed Dec. 26, 2017 to Office Action dated Jun. 29, 2017", W/English Claims, 14 pgs.

"CollegeView", Wayback machine on Nov. 10, 2014, [Online]. Retrieved from the Internet: <http://www.collegeview.com/index.jsp>, (Nov. 23, 2012), 1 pg.

"European Application No. 16002383.4, Extended European Search Report dated Mar. 22, 2017", 7 pgs.

"European Application No. 16002383.4, Response filed Oct. 18, 2017 to Extended European Search Report dated Mar. 22, 2017", 19 pgs.

"European Application Serial No. 13733942.0, Extended European Search Report dated Jul. 29, 2015", 8 pgs.

"European Application Serial No. 13733942.0, Office Action dated Nov. 4, 2013", 2 pgs.

"European Application Serial No. 13733942.0, Response filed Feb. 24, 2016 to Office Action dated Nov. 4, 2013", 24 pgs.

"International Application Serial No. PCT/US2013/033857, International Preliminary Report on Patentability dated Oct. 9, 2014", 9 pgs.

"International Application Serial No. PCT/US2013/033857, International Search Report dated Jul. 2, 2013", 2 pgs.

"International Application Serial No. PCT/US2013/033857, Written Opinion dated Jul. 2, 2013", 7 pgs.

"International Application Serial No. PCT/US2013/068763, international Preliminary Report on Patentability dated May 21, 2015", 7 pgs.

"International Application Serial No. PCT/US2013/068763, International Search Report dated May 2, 2014", 2 pgs.

"International Application Serial No. PCT/US2013/068763, Written Opinion dated May 2, 2014", 5 pgs.

"International Application Serial No. PCT/US2015/020289, International Preliminary Report on Patentability dated Dec. 15, 2016", 8 pgs.

"International Application Serial No. PCT/US2015/020289, International Search Report dated Jun. 22, 2015", 2 pgs.

"International Application Serial No. PCT/US2015/020289, Written Opinion dated Jun. 22, 2015", 6 pgs.

Ackerman, Mark, "Sharing Expertise: Beyond Knowledge Management", The MIT Press (Cambridge, Massachusetts), (2003), 438 pgs.

Becerra-Fernandez, Irma, "Searching for Experts on the Web: A Review of Contemporary Expertise Locator Systems", ACM Transactions on Internet Technology 6(4), (Nov. 2006), 333-355.

D'Amore, Raymond, "Expertise Community Detection", SIGIR, (Jul. 25-29, 2004), 498-499.

Dom, Byron, et al., "A Bayesian Technique for Estimating the Credibility of Question Answerers", SIAM, (2008), 399-409.

Dom, Byron, et al., "Graph-Based Ranking Algorithms for E-mail Expertise Analysis", DMKD, (Jun. 13, 2003), 42-48.

Fu, Yupeng, et al., "Finding Experts Using Social Network Analysis", IEEE/WIC/ACM International Conference on Web Intelligence, (2007), 77-80.

Grolmus, Petr, et al., "A Web-Based User-Profile Generator: Foundation for a Recommender and Expert Finding System", 8th ICCC International Conference on Electronic Publishing, (Jun. 2004), 331-342.

Haselmann, Till, et al., "Towards a Conceptual Model for Trustworthy Skills Profiles in Online Social Networks", ERCIS, (2010), 13 pgs.

Huh, Eui-Nam, et al., "A Framework of Online Community based Expertise Information Retrieval on Grid", Kyung Hee University Memo, (Aug. 11, 2008), 21 pgs.

Huh, Eui-Nam, et al., "A Framework, of Online Community based Expertise Information Retrieval on Grid", Kyung Hee University Memo, (Jan. 14, 2010), 21 pgs.

John, Ajita, et al., "Collaborative Tagging and Expertise in the Enterprise", WWW2006, (May 22-26, 2006), 6 pgs.

Li, Juanzi, et al., "EOS: Expertise Oriented Search Using Social Networks", WWW 2007 / Poster Paper, (May 8-12, 2007), 1271-1272.

Lin, Ching-Yung, et al., "SmallBlue: Social Network Analysis for Expertise Search and Collective Intelligence", IEEE International Conference on Data Engineering, (2009), 1483-1486.

Lin, Chin-Yung, et al., "SmallBlue: People Mining for Expertise Search", IEEE MultiMedia, 15(1), (2008), 78-84.

Malek, Maria, et al., "Exhaustive and Guided Algorithms for Recommendation in a Professional Social Network", EISTI-Laris laboratory, PRES Cergy University, (Jul. 31, 2010), 19 pgs.

Meyer, Bertolt, et al., "skillMap: dynamic visualization of shared organizational context", Institute of Information Systems, Humboldt University Berlin, (Feb. 20, 2006), 13 pgs.

Pretschner, Alexander, "Ontology Based Personalized Search", Department of Electrical Engineering and Computer Science, University of Kansas, (1998), 125 pgs.

Stankovic, Milan, et al., "Looking for Experts? What can Linked Data do for you?", LDOW, (Apr. 27, 2010), 10 pgs.

Steggles, Andy, "Keeping Score of Your Online Member Engagement", Associations Now, [Online]. Retrieved from the Internet: <URL: http://www.asaecenter.org/Resources/ANowDetail.cfm?ItemNumber=3828>, (Jan. 2009), 7 pgs.

Tang, Jie, et al., "ArnetMiner: An Expertise Oriented Search System for Web Community", International Semantic Web Conference—ISWC, (2007), 8 pgs.

Tang, W, et al., "Learning to Infer Social Ties in Large Networks", Springer-Verlag Berlin Heidelberg; ECML PKDD, Part III, LNAI 6913, (2011), 381-397.

Yimam-Seid, Dawit, et al., "Expert Finding Systems for Organizations: Problem and Domain Analysis and the DEMOIR Approach", Journal of Organizational Computing and Electronic Commerce 13(1), (2003), 1-24.

Zhang, Jing, et al., "Expert Finding in a Social Network", Department of Computer Science and Technology, Tsinghua, University Database Systems for Advanced Applications—DASFAA, (2007), 1066-1069.

U.S. Appl. No. 13/357,171, U.S. Pat. No. 8,650,177, filed Jan. 24, 2012, Skill Extraction System.

U.S. Appl. No. 13/357,302, filed Jan. 24, 2012, Skill Ranking System.

U.S. Appl. No. 13/357,360, filed Jan. 24, 2012, Skill Customization System.

U.S. Appl. No. 14/072,955, filed Nov. 6, 2013, Skill Extraction System.

(56) References Cited

OTHER PUBLICATIONS

U.S. Appl. No. 13/430,284, U.S. Pat. No. 9,971,993, filed Mar. 26, 2012, Leveraging a Social Graph for Use With Electronic Messaging.
U.S. Appl. No. 13/548,957, filed Jul. 13, 2012, Techniques for Identifying and Presenting Connection Paths.
U.S. Appl. No. 13/629,241, filed Sep. 27, 2012, Inferring and Suggesting Attribute Values for a Social Networking Service.
U.S. Appl. No. 13/672,377, U.S. Pat. No. 9,654,592, filed Nov. 8, 2012, Skills Endorsements.
U.S. Appl. No. 15/441,529, U.S. Pat. No. 10,027,778, filed Feb. 24, 2017, Skills Endorsements.
U.S. Appl. No. 14/788,440, filed Jun. 30, 2015, Third Party Endorsements.
"Third Office Action Issued in Chinese Patent Application No. 201380069898.1", dated Oct. 31, 2018, 13 Pages.

\* cited by examiner

SKILLS ENDORSEMENTS

CROSS-REFERENCE TO RELATED APPLICATION

This application is a Continuation of U.S. application Ser. No. 15/441,529, filed on Feb. 24, 2017, which is a Continuation of U.S. application Ser. No. 13/672,377, filed on Nov. 8, 2012, the contents of which are hereby incorporated by reference in their entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright LinkedIn, All Rights Reserved.

BACKGROUND

A social networking service is a computer or web-based application that enables users to establish links or connections with persons for the purpose of sharing information with one another. Some social networks aim to enable friends and family to communicate with one another, while others are specifically directed to business users with a goal of enabling the sharing of business information.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 3 shows a screen shot of an endorsement interface according to some examples of the present disclosure.

FIG. 4 shows a screen shot of a presentation of an endorsement recommendation according to some examples of the present disclosure.

DETAILED DESCRIPTION

Figure 1:
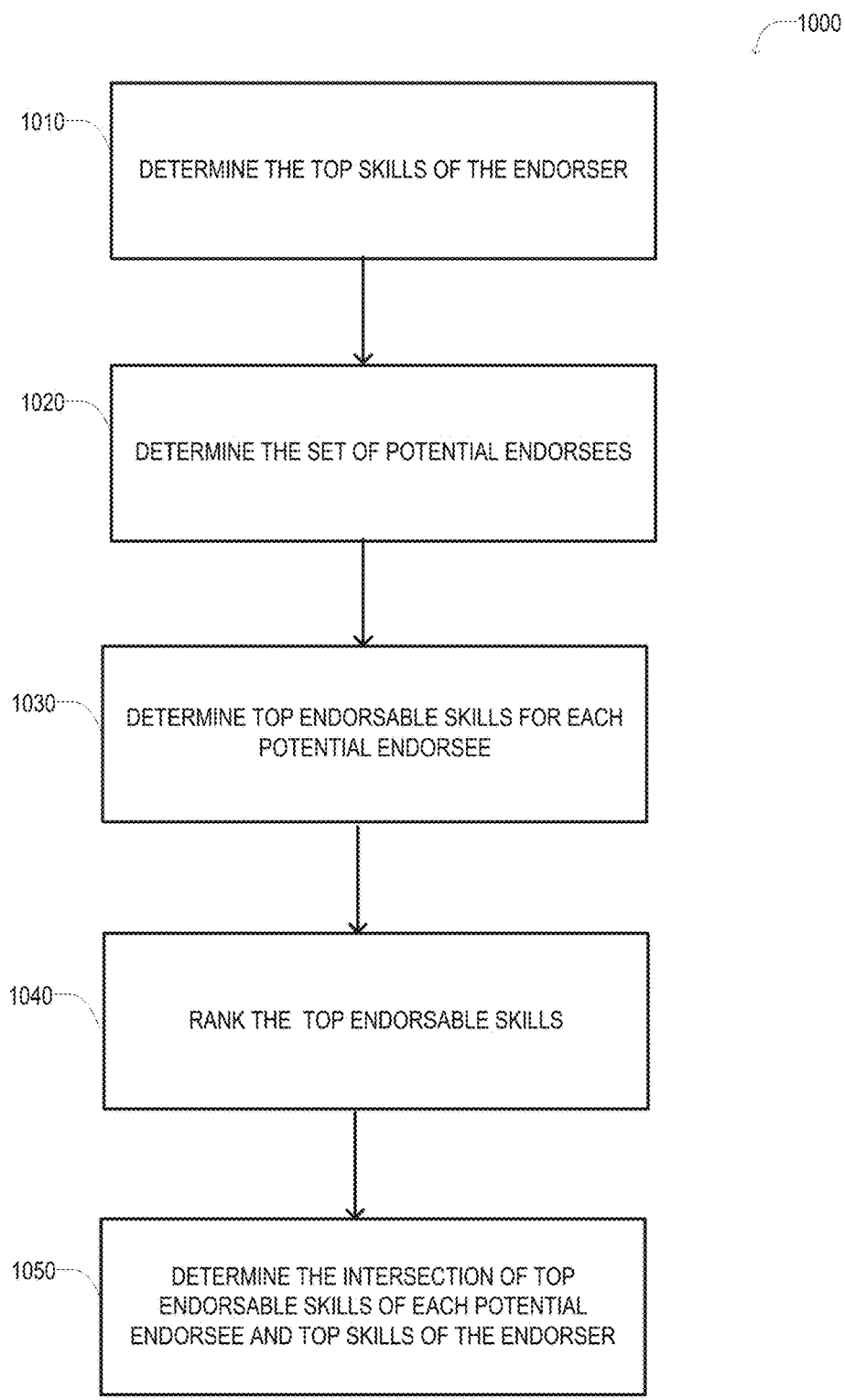
FIG. 1 shows a flowchart of a method of generating an endorsement recommendation according to some examples of the present disclosure.
Figure 2:
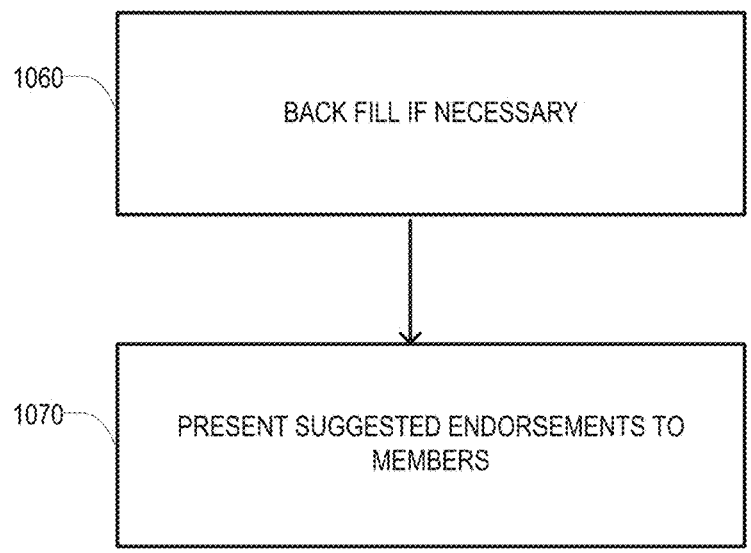
FIG. 2 shows a flowchart of a method of generating an endorsement recommendation according to some examples of the present disclosure.

In the following, a detailed description of examples will be given with references to the drawings. It should be understood that various modifications to the examples may be made. In particular, elements of one example may be combined and used in other examples to form new examples.

Many of the examples described herein are provided in the context of a social or business networking website or service. However, the applicability of the inventive subject matter is not limited to a social or business networking service. A social networking service is an online service, platform or site that allows members to build or reflect social networks or social relations among members. Typically, members construct profiles, which may include personal information such as name, contact information, employment information, photographs, personal messages, status information, links to web-related content, blogs, and so on. Typically, only a portion of a members profile may be viewed by the general public, and/or other members.

The social networking site allows members to identify, and establish links or connections with other members in order to build or reflect social networks or social relations among members. For instance, in the context of a business networking service (a type of social networking service), a person may establish a link or connection with his or her business contacts, including work colleagues, clients, customers, and so on. With a social networking service, a person may establish links or connections with his or her friends and family. A connection is generally formed using an invitation process in which one member "invites" a second member to form a link. The second member than has the option of accepting or declining the invitation. In some examples, some social networking services operate on a subscription or following basis, where one member follows another without mutual agreement. For example, Twitter, a micro-blogging service allows members to follow other members without explicit permission.

In general, a connection or link represents or is otherwise associated with an information access privilege, such that a first person who has established a connection with a second person is, via the establishment of that connection, authorizing the second person to view or access non-publicly available portions of their profiles. Of course, depending on the particular implementation of the business/social networking service, the nature and type of the information that may be shared, as well as the granularity with which the access privileges may be defined to protect certain types of data may vary greatly.

Social networks may also provide various services to their members. One example of such a service is the formation of skill communities through the identification of skills a member possesses based upon both self-reported skills and inferred skills determined by the social network based upon information in member profiles. The individuals possessing a given skill may form a skill community. Various functionality may be provided for the skill community by the social networking service. For example, members within the skill community may be ranked relative to each other. Other examples may include advertising targeted to a particular skill, recruiting and employment services based on skill, or the like. The formation and use of such skill communities is described in U.S. patent application Ser. No. 13/357,171 filed on Jan. 24, 2012 to Skomoroch et. al and entitled "SKILL EXTRACTION SYSTEM," which is hereby incorporated by reference in its entirety, U.S. patent application Ser. No. 13/357,302 filed on Jan. 24, 2012 to Skomoroch et. al. and entitled "SKILL RANKING SYSTEM," which is hereby incorporated by reference in its entirety, and U.S. patent application Ser. No. 13/357,360 filed on Jan. 24, 2012 to Skomoroch et. al. and entitled "SKILL CUSTOMIZATION SYSTEM," which is hereby incorporated by reference in its entirety. In some examples, the system may suggest one or more skills that the member may possess for addition to the member's profile. These suggestions may be based on the information in the member's profile and on aggregate statistics regarding other members of the social networking service. Suggesting skills based upon information inferred from a member's profile is described in U.S. patent application Ser. No. 13/629,241 filed on Sep. 27, 2012 to Bastian, et. al. entitled "Inferring and Suggesting Attribute Values for a Social Networking Service," which is hereby incorporated by reference in its entirety.

The preceding discussion illustrates some of the examples to which skills information may be created and used in a social networking service. However, the skills information can be enhanced through the addition of a social component. That is, skills are recommended to members based on the information in their profiles, or are added by members themselves, but there does not currently exist a system whereby other members of the social network may signal information about their knowledge of the skill-sets of other members.

Disclosed in some examples are methods, systems, and machine-readable media which allow members of a social networking service to endorse the skills of another member. A skill endorsement may be a positive affirmation that the endorsing member personally knows that the endorsee member possesses the endorsed skill. In some examples, a member may seek out an endorsement from another member or seek out to endorse another member, but in other examples the social networking system may suggest a member endorse one or more other members for skills. Endorsements may be made for skills which the member lists on their profiles, or on skills not already listed on a member's profile. In the latter case, endorsements may "nudge" others to add skills to their profiles—increasing the adoption of skill communities. These endorsements also allow members to provide a positive signal about a specific attribute of a member. These positive signals may be used in a variety of ways, such as for example, advertisement, recruiting, or the like. In yet other examples, the endorsements may be used as a signal to the skill ranking algorithms that rank individuals with a particular skill relative to each other.

Skill endorsements may be a simple yes or no response to a skill (e.g., the member does indeed have a particular skill), but in other examples, the endorser may be given the opportunity to rate the endorsee member's proficiency in the skill. For example, the endorser may rate the endorsee on a scale of one to ten, or the like.

Endorsements may be made in many ways. Examples include presenting a dialogue box when the potential endorser visits the endorsee's member profile page or from some other web page in the social networking site, such as the potential endorser's member page. For example, the potential endorser may seek out and actively endorse an endorsee for a skill. Endorsements may be made by clicking or selecting various graphical elements which by their clicking or selection indicate an intention by the endorser to endorse a particular endorsee in one or more skills.

While the process may be driven by a potential endorser seeking out skills of an endorsee to endorse, in other examples, the system may recommend a particular member endorse one or more other member's skills. The system may present these recommendations in a variety of ways. For example, the system may present a dialogue box, a side bar, or may place the suggestions on the potential endorser's member page. The endorsement recommendations may be tailored to skills the system infers that users have in common. This may allow the system to provide more meaning for endorsements by attempting to limit the potential endorsers to those individuals who are likely to have knowledge of the skill as those individuals have that skill.

In some examples, members may only endorse their own connections. This may ensure that only those who are likely to have knowledge of that member and their potential skillset may make an endorsement. In yet other examples, members who are not connected may make endorsements. This may allow for the endorsement of individuals based on general reputation instead of personal knowledge. In yet other examples, other connection degree thresholds may be used. For example, if there is a second degree connection threshold, if member X is connected to member Y, and member Y is connected to member Z (but X and Z are not connected), and member Z is connected to member A (but A and X are not connected), then because X is a second degree connection to Z, the system may allow member X to endorse member Z. However, because X is at best a third degree connection to A, the system may not allow X to endorse A. This may be done to limit meaningless endorsements (e.g., endorsement spam).

In some examples, the system may allow a potential endorser to endorse another individual for a certain skill only if they also possess (or the system infers they possess) the skill themselves. As already noted, this may increase the accuracy of the endorsement because one would expect that the potential endorser would have knowledge of the skill area and be able to better judge a member's aptitude for the skill. In yet other examples, anyone may endorse any particular skill.

Members may be motivated to endorse other members for several reasons, including goodwill (e.g., the desire to help out a connection), a desire for a reciprocal endorsement, or for some other reason. To encourage endorsement behavior, the system may reward prolific endorsers through public recognition (e.g., an endorser "leaderboard"), a graphic on their profile (a "badge"), or the like. The endorsements a user receives may be shown on their profile, for example, a count of the number of members endorsing a particular member for each skill may be shown.

The social networking system may utilize endorsement information to improve the skill communities by increasing the rank of an individual in the skill community based upon the endorsement information. Rank may be increased based on the number of endorsements. In some examples, the quality of the endorsements may also be considered. Thus for example, if an endorsement comes from another high ranking individual, that endorsement may increase the endorsee's rank more than an endorsement from a lower ranked individual. In other examples, endorsements may be weighted based on other factors. For example, an endorsement from a person likely to have personal knowledge of that skill (e.g., a co-worker for a skill likely to be used in that occupation) might count more than an endorsement from a person less likely to have personal knowledge of that skill (e.g., a co-worker for a skill not likely to be used in that occupation, or from a relative or friend for a skill likely to be used in the endorsee's occupation). In other examples, endorsements from people who visit the endorsee's profile page often or are more closely linked with the endorsee may be more heavily weighted.

Endorsements may be searchable. These searches may be filtered based upon any data in the member profile. For example, a person may search to see who in a particular company has endorsed individuals outside a particular company in a particular skill or set of skills. This may be useful if an employer is looking for a person with a particular skill whose skill has already been endorsed by other individuals within the company. Thus the endorsements may function as signals to employers looking for job candidates.

Advertising may also utilize the endorsements features. As endorsements may be a signal of how knowledgeable a member is in a skill, the more knowledgeable the member is in a skill, the advertisement message may change, or the product advertised may change. For example, if a member skilled in computer programming with many endorsements may be presented with advertisements for more advanced computer programming textbooks than a member with fewer endorsements.

One aspect which may help drive users to establish skills in their profiles and to encourage members to endorse each other may be the presentation of suggestions that members endorse another member. Turning now to FIG. 1, an example method of suggesting an endorsement 1000 is shown. At operation 1010 the system may determine the top skills of the potential endorser member. The top skills selected may be based upon the skills already added to the potential endorser's profile, or based upon other information in the member's profile. An example method for inferring skills based on information in the member's profile is described in U.S. patent application Ser. No. 13/629,241 filed on Sep. 27, 2012 to Bastian, et. al. entitled "Inferring and Suggesting Attribute Values for a Social Networking Service," which is hereby incorporated by reference in its entirety. Briefly, to suggest a skill, the data in the potential endorser's member profile may be compared with statistical probability data calculated from other member's profiles to generate a recommendation for that member. So, for example, if members with particular attributes (such as employment, education, other skills) A and B also frequently possess skill C, then it is likely that a member with attributes A and B who does not list skill C on their profile will have skill C. The system may calculate a probability matrix for each individual attribute which calculates, given a member's particular attribute values for that attribute, the probability that the member has a skill of interest. These individual probability vectors may then be normalized, weighted, and combined to yield a final probability for each skill. This final probability describes the probability that the member has that particular skill of interest. If the probability that the member possesses a given skill is high enough, the system may infer that the member possesses the given skill.

Once the list of skills a member possesses is determined, those skills may be ranked. One example ranking algorithm is described in U.S. patent application Ser. No. 13/357,302 filed on Jan. 24, 2012 to Skomoroch et. al. and entitled "SKILL RANKING SYSTEM," which is hereby incorporated by reference in its entirety. Briefly, the system ranks members relative to each other members for each skill by a ranking algorithm that considers various signals such as whether the member is connected to other members possessing the given skill and what those member's ranking is, member industry information, how much experience the member has at a job associated with the skill, or the like.

Once the skills are ranked, the system may then determine a number of high ranking skills (e.g., the top fifty skills, the top twenty-five skills, or the like). This set of skills may constitute a potential endorser's endorsement skill set (hereinafter "endorsement set").

At operation 1020 the system may determine a set of potential endorsee members from the entire set of members. The set of members may be based on a number of factors including connection degree (e.g., a first degree, second degree, third degree, or the like), connection strength, common member attributes (e.g., employment, skills, education, or the like), or the like. In some examples, only a member's connections may be potential endorsees. This may allow some degree of confidence that the potential endorser is familiar enough with the potential endorsee to make a reasoned endorsement.

A social networking service may represent the connections of its members as a social graph having nodes and edges. The nodes may represent different entities and the edges represent various associations or relationships between entities. Connection strength may be a score which reflects the overall strength (or relevance) of a path on the graph connecting the potential endorsee with a potential endorser. In some examples the edges between nodes may be weighted to reflect the relationship between the nodes. For example, one weight may apply to two nodes who are members who are directly connected to each other. Another weight may reflect a connection between a member and an institution (such as a school or company). Another weight may reflect one member is following another member. Yet another weight may be based upon messages or other communications exchanged between the nodes. The connection strength in some examples is the sum of the edge weights of the path between two nodes. Members who have a connection strength to the potential endorser above a predetermined threshold may be included in the group of potential endorsees. In yet other examples, members must have a connection strength to their potential endorsee that is greater than a predetermined threshold to even endorse another member. Connection strength is disclosed in greater detail in U.S. patent application Ser. No. 13/548,957 entitled "Techniques for Identifying and Presenting Connection Paths," filed on Jul. 13, 2012, which is hereby incorporated by reference in its entirety.

At operation 1030, the system may determine the top endorsable skills for each potential endorsee member. This may be accomplished in the same method as is done for the potential endorser member (e.g., operation 1010). At operation 1030 the top endorsable skills for each potential endorsee are determined. This may be accomplished in the same method as is done for the potential endorser member (e.g., operation 1020).

At operation 1050, the system may determine an intersection of the top endorsable skills of each potential endorsee and the top endorsable skills of the potential endorser. This intersection forms the set of potentially endorsable skills. Thus for example, if the potential endorser member X has Java and basket weaving as his top skills and potential endorsee member Y has Java and cooking as her top skills, the potentially endorsable skills for X endorsing Y would be Java.

At operation 1060, the system back fills if necessary. For example, if the system wishes to present ten endorsements, and the intersecting sets of endorsable skills for the potential endorsing member and the potential endorsee member are not large enough to present ten endorsements, the system may add additional skills to the sets. The system may do this by adding skills from the potential endorsee's list of top skills. In other examples, the system may consider skills not listed as "top" endorsable skills. For example the system may attempt to find an intersection of skills that the potential endorser and potential endorsee have that are not rated as the top skills. In other examples, if there still are not enough skills, the system may simply backfill with skills the potential endorsee has that the potential endorser does not have.

At operation 1070 the system may present the suggested endorsements to the potential endorser. As already noted, these may be presented to the potential endorser in a dialogue box, on a section of the member's profile, in a section of the social networking service, in response to the potential member endorsing another member (e.g., once the member endorses for one skill, the system may suggest additional endorsements), or the like.

As already noted, the skills used in the endorsement recommendation process may be either explicitly added skills—that is, skills members themselves add to their profile, or may be implicit skills. Implicit skills, as earlier explained, are skills that the social networking service may have a degree of confidence that the member possesses based upon other information in the member's profile, even if those skills are not explicitly listed in the members profile. Thus the system may determine a list of potential endorseable skills based either or both explicitly added skills and implicitly derived skills for either or both of the potential endorser and the potential endorsee. Deriving implicit skills from information in the member's profile is described in U.S. patent application Ser. No. 13/629,241 filed on Sep. 27, 2012 to Bastian, et. al. entitled "Inferring and Suggesting Attribute Values for a Social Networking Service," which is hereby incorporated by reference in its entirety.

Figure 3:
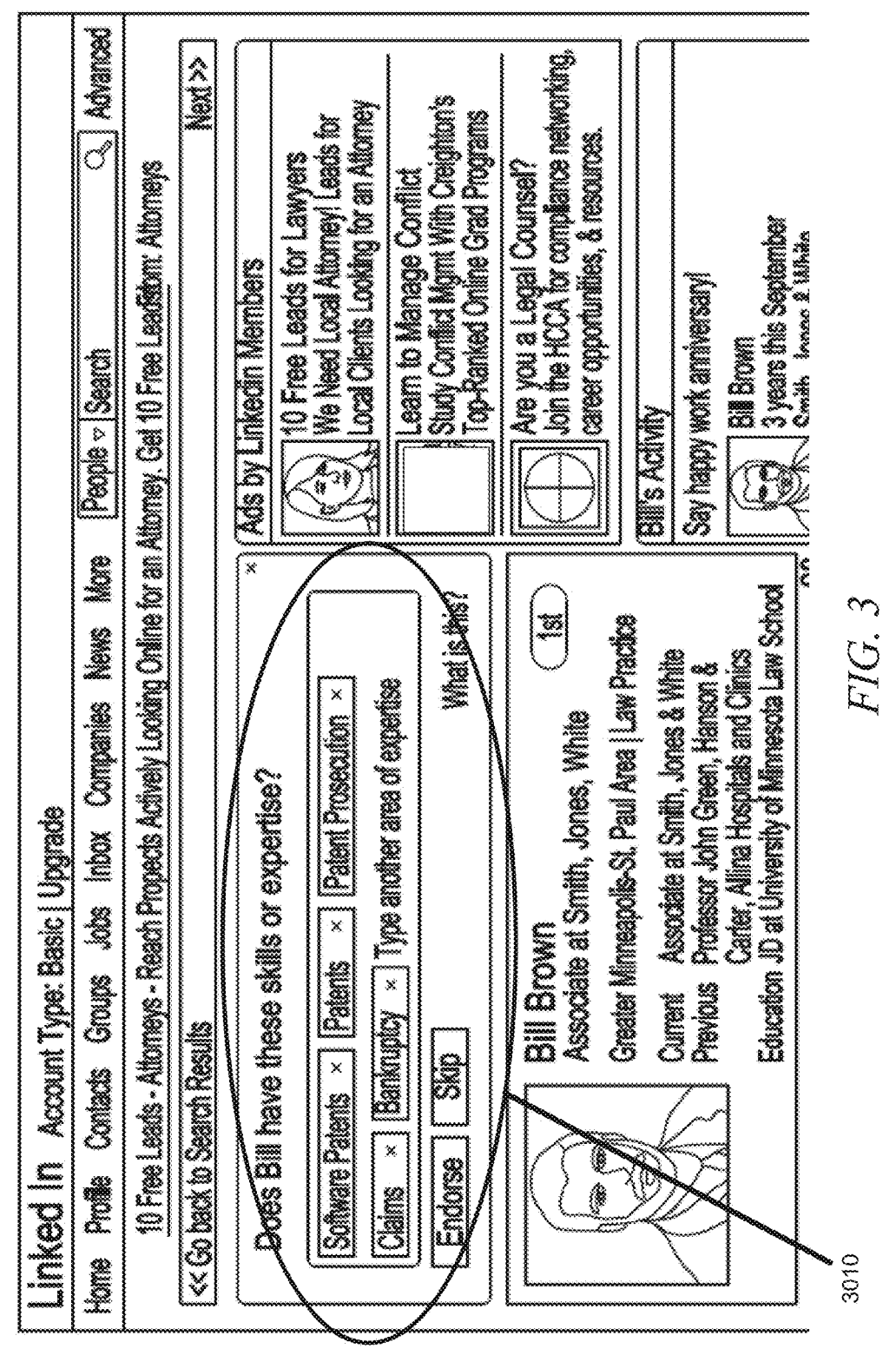

Turning now to FIG. 3, an example screenshot of an endorsement recommendation system 3000 is shown. As shown, a potential endorsing member visiting a profile of a potential endorsee member may be presented with a dialogue box 3010 which allows a potential endorsing member to endorse the member's skills.

Figure 4:
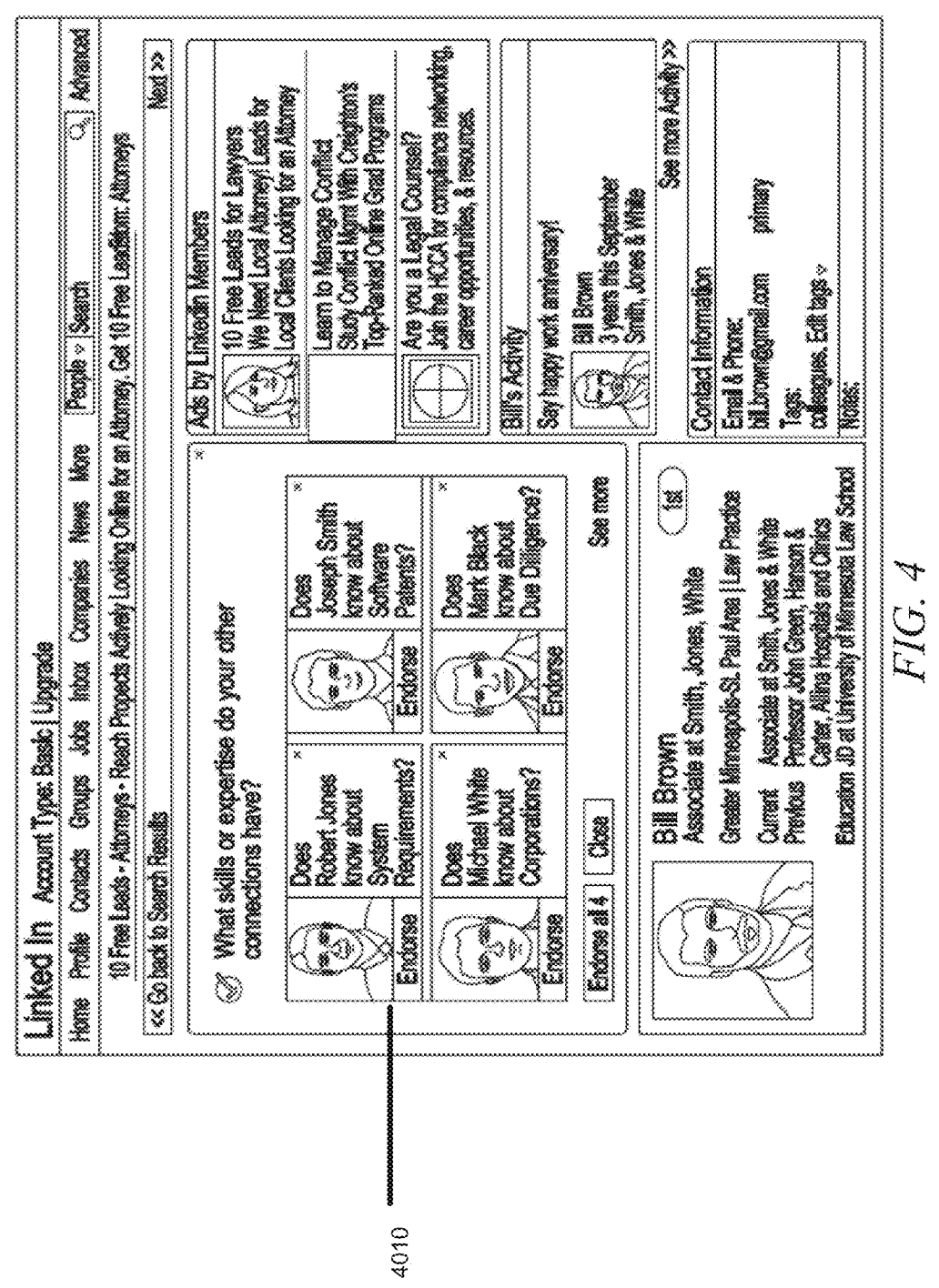

Turning now to FIG. 4, if the potential endorser endorses the member from FIG. 3, suggested endorsements for other members may be displayed at 4010. In the example of 4010, the skills shown for endorsement are limited to a single skill for a plurality of other members. In other examples, multiple skills may be shown.

Figure 5:
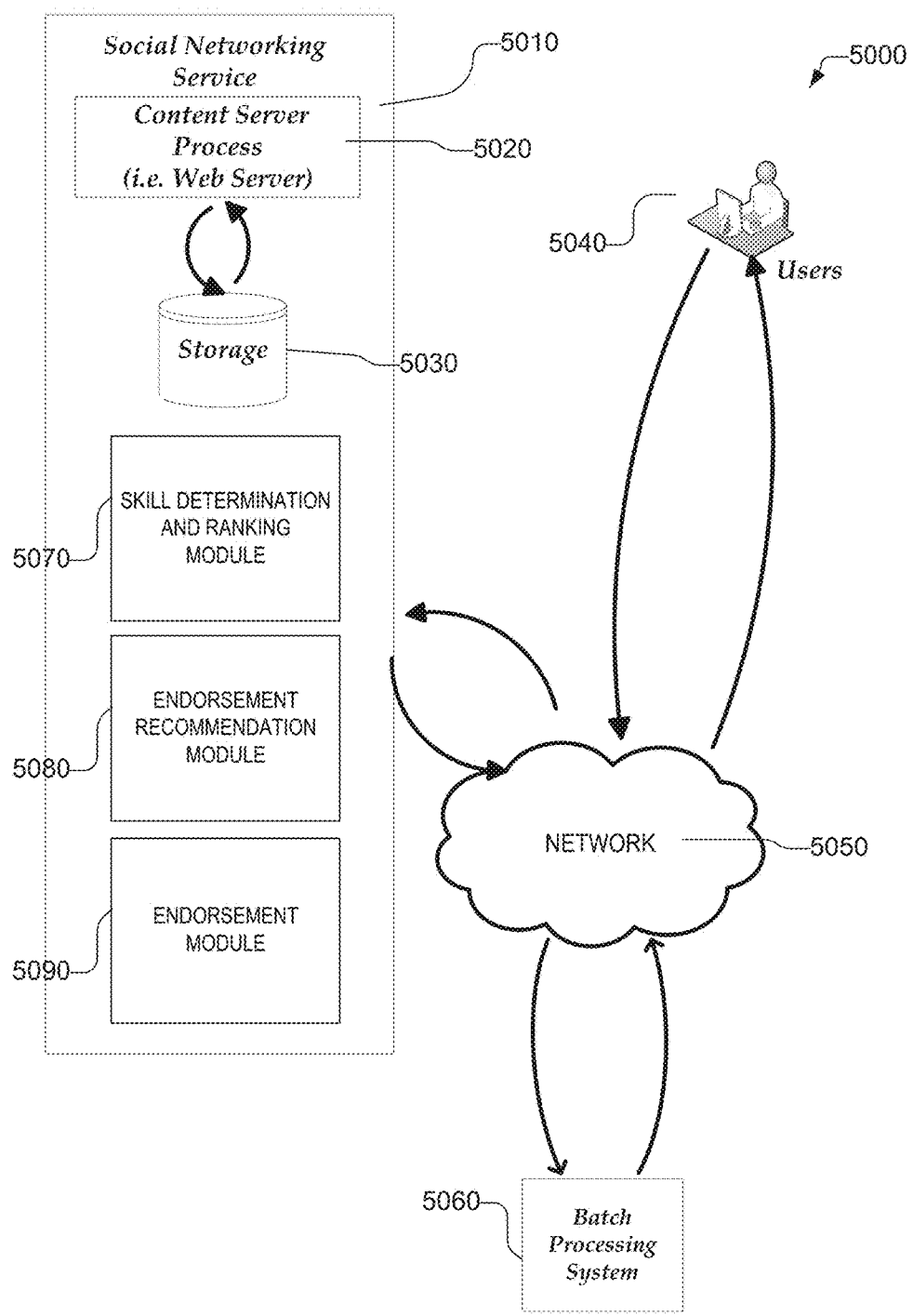
FIG. 5 shows a schematic of a social networking system and associated endorsement components according to some examples of the present disclosure.

FIG. 5 shows an example system 5000 for providing a social networking service and for providing skill related features including skill endorsements. Social networking service 5010 may contain a content server process 5020. Content server process 5020 may communicate with storage 5030 and may communicate with one or more users 5040 through a network 5050. Content server process 5020 may be responsible for the retrieval, presentation, and maintenance of member profiles stored in storage 5030. Content server process 5020 in one example may include or be a web server that fetches or creates internet web pages. Web pages may be or include Hyper Text Markup Language (HTML), eXtensible Markup Language (XML), JavaScript, or the like. The web pages may include portions of, or all of, a member profile at the request of users 5040.

Users 5040 may include one or more members, prospective members, or other users of the social networking service 5040. Users 5040 access social networking service 5010 using a computer system through a network 5050. The network may be any means of enabling the social networking service 5010 to communicate data with users 5040. Example networks 5050 may be or include portions of: the Internet, a Local Area Network (LAN), a Wide Area Network (WAN), wireless network (such as a wireless network based upon an IEEE 802.11 family of standards), a Metropolitan Area Network (MAN), a cellular network, or the like.

Endorsement module 5090 may manage the endorsements of skills on the social networking service. For example, endorsement module 5090 may cause the endorsement requests to appear to one or more users 5040. In addition, the endorsement module 5090 may receive endorsement input (such as a user endorsing another user) and may process that endorsement input. Example processing steps may include storing an indicium of the endorsement in one or both of the endorsee or endorser's member profiles, publishing the endorsement to a news feed or stream associated with the endorser and/or endorsee, notification of the endorsee that the endorser endorsed a skill, updating the skill rankings as a result of endorsements, and the like. In examples in which the endorser endorsed the endorsee for a skill that is not explicitly added to the endorsee's member profile and was either suggested by the endorser (e.g., the endorser selected the skill), or was inferred by the system and endorsed by the endorser, the endorsement module 5100 may manage an approval process which may require the endorsee to approve adding the skill to his or her profile prior to registering the endorsement for that skill.

Endorsement module 5090 may also work with endorsement recommendation module 5080 to coordinate the generation and display of suggested endorsements. Endorsement recommendation module 5080 may determine the potential endorsees and may coordinate with the skill determination and ranking module 5070 to determine the top ranked skills associated with the potential endorser based upon the potential endorser's member profile as well as the top ranked skills for each of the potential endorsees.

Skill determination and ranking module 5070 may determine one or more skills associated with, or inferred from, a member profile. For example, the member profile might list certain skills in the profile, but in other examples, the system may be able to infer that the user possesses a given skill based upon their attributes as stored in the member profile. Skill determination and ranking module 5070 may then rank those skills in order of how good the system feels the member is at the skill as previously discussed.

The endorsement recommendation module 5080 may then determine the intersection of the highly ranked skills of the potential endorsing member and the potential endorsee member. This set of skills may then be recommended as potential endorsements to potential endorsing members 5040 by either the endorsement recommendation module 5080, or the endorsement module 5090.

One or more of the functions of the social networking service 5010, such as the skill determination and ranking module 5070, the endorsement recommendation module 5080 and the endorsement module 5090 may execute either as part of social networking service 5010 or may be run on a batch processing system 5060. Batch processing system 5060 may be a computing entity which is capable of data processing operations either serially or in parallel. In some examples, batch processing system 5060 may be a single computing system, but in other examples, batch processing system 5060 may be a series of computers setup to process data in parallel. In yet other examples, batch processing system 5060 may be a part of social networking system 5010.

While users 5040, social networking service 5010 and batch processing system 5060 are shown communicating through the same network 5050, social networking service 5010 may communicate with user 5040 through a separate network, or a separate part of network 5050 than what social networking service 5010 uses to communicate with batch processing system 5060.

In some examples, certain aspects of the present disclosure may be done in parallel using a batch processing system (such as batch processing system 5060) over a distributed computer system. In some examples, this distributed computer system may be managed by Apache Hadoop, which is a software framework that supports data intensive distributed applications developed by the Apache Software Foundation, Inc. In some examples, certain aspects of the present disclosure may be implemented by the MapReduce software method which is a framework for processing huge datasets on distributable problems using a large number of computers (or nodes) which are referred to as a cluster. MapReduce is described in U.S. Pat. No. 7,650,331 issued to Dean, et. al. and assigned to Google Inc., of Mountain View, Calif., which is hereby incorporated by reference in its entirety. In MapReduce, there are two phases: the map phase and the reduce phase. In the "map" phase, "chunks" of data are assigned to different servers which then process the data according to a defined algorithm and return a result. The servers may break up the data into even smaller chunks and assign each smaller chunk to a map process running on the server, where many map functions may execute on a single server. The results from all the map processes are then aggregated according to a predefined process in the "reduce" phase.

These examples can be combined in any permutation or combination. This overview is intended to provide an overview of subject matter of the present patent application. It is not intended to provide an exclusive or exhaustive explanation of the invention. The detailed description is included to provide further information about the present patent application.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 6:
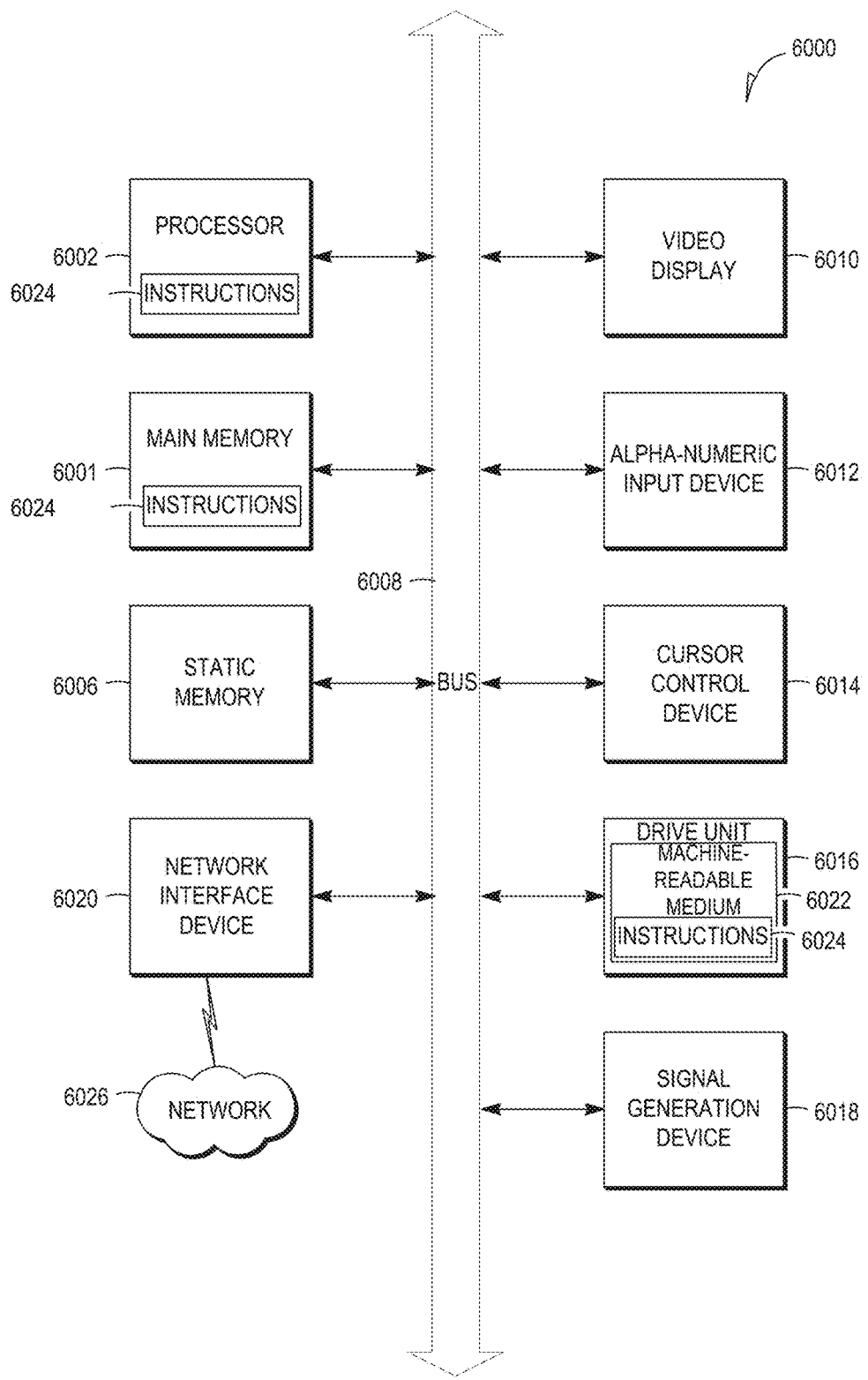
FIG. 6 shows a schematic of a machine according to some examples of the present disclosure.

FIG. 6 is a block diagram of machine in the example form of a computer system 6000 within which instructions, for causing the machine to perform any one or more of the methodologies discussed herein, may be executed. For example, any one of the components shown in FIG. 5 may be or contain one or more of the components described in FIG. 6. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a notebook PC, a docking station, a wireless access point, a tablet PC, a set-top box (STB), a PDA, a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The machine may contain components not shown in FIG. 6 or only a subset of the components shown in FIG. 6.

The example computer system 6000 includes a processor 6002 (e.g., a central processing unit (CPU), a graphics processing unit (GPU) or both), a main memory 6004 and a static memory 6006, which communicate with each other via a bus 6008. The computer system 6000 may further include a video display unit 6010 (e.g., a liquid crystal display (LCD) or a cathode ray tube (CRT)). The computer system 6000 also includes an alphanumeric input device 6012 (e.g., a keyboard), a user interface (UI) navigation device 6014 (e.g., a mouse), a disk drive unit 6016, a signal generation device 6018 (e.g., a speaker) and a network interface device 6020.

Machine-Readable Medium

The disk drive unit 6016 includes a machine-readable medium 6022 on which is stored one or more sets of instructions and data structures (e.g., software) 6024 embodying or used by any one or more of the methodologies or functions described herein. The instructions 6024 may also reside, completely or at least partially, within the main memory 6004, static memory 6006, and/or within the processor 6002 during execution thereof by the computer system 6000, the main memory 6004 and the processor 6002 also constituting machine-readable media.

While the machine-readable medium 6022 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of example, semiconductor memory devices (e.g., Erasable Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

Transmission Medium

The instructions 6024 may further be transmitted or received over a communications network 6026 using a transmission medium. The instructions 6024 may be transmitted using the network interface device 6020 and any one of a number of well-known transfer protocols (e.g., HTTP). Examples of communication networks include a LAN, a WAN, the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software. Network interface 6020 may wirelessly transmit data and may include an antenna.

OTHER NOTES AND EXAMPLES

Example 1

A method comprising: determining a first set of high ranking skills, the first set containing skills possessed by a member of the social networking service based upon the member's user profile; determining a second set of high ranking skills, the second set containing skills for a second member of the social networking service based on the second member's user profile; determining a third set of high ranking skills, the third set being the intersection between the first and second set of high ranking skills; and suggesting one or more of the skills in the third set of high ranking skills to the member for endorsement of the second member with respect to that skill.

Example 2

The method of example 1, wherein suggesting the one or more of the skills in the third set comprises asking the member if the second member has the one or more skills.

Example 3

The method of any one of examples 1-2, wherein suggesting the one or more of the skills in the third set comprises asking the member if they would rate the second member on their proficiency on the one or more skills.

Example 4

The method of any one of examples 1-3, wherein the second member is selected from a plurality of members of the social networking service based upon a connection strength between the member and the second member.

Example 5

The method of any one of examples 1-4, comprising: responsive to receiving input indicating that the second member has the one or more skills from the first member, notifying the second member that they were endorsed by the first member.

Example 6

The method of example 5, wherein the notification is one of: email, text message, a notification on the second user's member profile, an item on the second user's news feed, an item on the first user's news feed.

Example 7

The method of any one of examples 1-6 comprising: responsive to receiving input indicating that the second member has the one or more skills from the first member, increasing a skill rank for the second member for that skill.

Example 8

A system for recommending skill endorsements, the system comprising: a skill determination and ranking module configured to determine a first set of high ranking skills, the first set containing skills possessed by a member of the social networking service based upon the member's user profile; the skill determination and ranking module configured to determine a second set of high ranking skills, the second set containing skills for a second member of the social networking service based on the second member's user profile; an endorsement module configured to determine a third set of high ranking skills, the third set being the intersection between the first and second set of high ranking skills, and the endorsement module configured to suggest one or more of the skills in the third set of high ranking skills to the member for endorsement of the second member with respect to that skill.

Example 9

The system of example 8, wherein the endorsement module is configured to suggest the one or more of the skills in the third set by at least asking the member if the second member has the one or more skills.

Example 10

The system of any one of examples 8-9, wherein the endorsement module is configured to suggest the one or more of the skills in the third set by at least asking the member if they would rate the second member on their proficiency on the one or more skills.

Example 11

The system of any one of examples 8-10, wherein the endorsement module is configured to select the second member from a plurality of members of the social networking service based upon a connection strength between the member and the second member.

Example 12

The system of any one of examples 1-11, wherein the endorsement module is configured to notify the second member that they were endorsed by the first member responsive to receiving input indicating that the second member has the one or more skills from the first member.

Example 13

The system of example 12, wherein the notification is one of: email, text message, a notification on the second user's member profile, an item on the second user's news feed, an item on the first user's news feed.

Example 14

The system of any one of examples 8-13 wherein the endorsement module is configured to increase a skill rank for the second member for that skill responsive to receiving input indicating that the second member has the one or more skills from the first member.

Example 15

A machine readable medium that stores instructions which when performed by a machine, cause the machine to perform operations comprising: determining a first set of high ranking skills, the first set containing skills possessed by a member of the social networking service based upon the member's user profile; determining a second set of high ranking skills, the second set containing skills for a second member of the social networking service based on the second member's user profile; determining a third set of high ranking skills, the third set being the intersection between the first and second set of high ranking skills; and suggesting one or more of the skills in the third set of high ranking skills to the member for endorsement of the second member with respect to that skill.

Example 16

The machine-readable medium of example 15, wherein the instructions for suggesting the one or more of the skills in the third set comprises instructions which when performed by the machine, cause the machine to ask the member if the second member has the one or more skills.

Example 17

The machine-readable medium of any one of examples 15-16, wherein the instructions for suggesting the one or more of the skills in the third set comprises instructions which when performed by the machine, cause the machine to ask the member if they would rate the second member on their proficiency on the one or more skills.

Example 18

The machine-readable medium of any one of examples 15-17, wherein the instructions include instructions which when performed by the machine cause the machine to perform the operations of: selecting the second member from a plurality of members of the social networking service based upon a connection strength between the member and the second member.

Example 19

The machine-readable medium of any one of examples 15-18, wherein the instructions include instructions which when performed by the machine cause the machine to perform the operations of: notifying the second member that they were endorsed by the first member responsive to receiving input indicating that the second member has the one or more skills from the first member.

Example 20

The machine-readable medium of example 19, wherein the notification is one of: email, text message, a notification on the second user's member profile, an item on the second user's news feed, an item on the first user's news feed.

Example 21

The machine-readable medium of any one of examples 15-20, wherein the instructions include instructions which when performed by the machine cause the machine to perform the operations of: increasing a skill rank for the second member for that skill responsive to receiving input indicating that the second member has the one or more skills from the first member.

Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
   using one or more computer processors:
      receiving an indication that a first user with a first member profile has visited a member profile page of a second user with a second member profile;
      selecting at least one particular skill corresponding to the first member profile and the second member profile that is one of a predetermined number of highest ranked skills for both the first and second member, the highest ranked skills based upon the first and second member profiles;
      presenting a graphical user interface to the first member, the graphical user interface configured for the first member to include an indication requesting, from the first member, an endorsement of the second member for the particular skill, the graphical user interface including a first selectable control to endorse the second member for the particular skill and at least a second selectable control to rate a quantified proficiency of the second member in the skill, the endorsement indicating that the first member thinks that the second member possesses the particular skill with a proficiency indicated by the rated quantified proficiency; and
      updating the second member profile based upon a selection by the first member of the second selectable control.

2. The method of claim 1, comprising:
responsive to receiving the endorsement of the particular skill from the first member, increasing a calculated skill rank for the second member for the particular skill based upon the rated quantified proficiency.

3. The method of claim 2, wherein an amount with which the calculated skill rank for the second member is increased for the particular skill depends on a skill rank of the first member for the particular skill and the rated quantified proficiency.

4. The method of claim 3, comprising:
determining that the first member, based upon the first member profile and the second member profile, is likely to have personal knowledge of the skill of the second member; and
in response, increasing the amount with which the calculated skill rank for the second member is increased for the particular skill.

5. The method of claim 4, wherein determining that the first member is likely to have personal knowledge of the skill of the second member comprises determining one or more of: that the first member is a co-worker of the second member; that the first member is a relative of the second member; or that the first member frequently views a webpage displaying at least a portion of the second member profile.

6. The method of claim 1, comprising:
receiving a search query, the search query requesting a list of members that work for a particular organization and that have endorsed other members who do not work for the particular organization for the particular skill; and
providing the list of members.

7. The method of claim 1, comprising:
notifying the second member that the first member has endorsed them.

8. A computing device comprising:
one or more hardware processors;
a memory comprising instructions, which when executed by the one or more hardware processors causes the one or more hardware processors to perform operations comprising:
receiving an indication that a first user with a first member profile has visited a member profile page of a second user with a second member profile;
selecting at least one particular skill corresponding to the first member profile and the second member profile that is one of a predetermined number of highest ranked skills for both the first and second member, the highest ranked skills based upon the first and second member profiles;
presenting a graphical user interface to the first member, the graphical user interface configured for the first member to include an indication requesting, from the first member, an endorsement of the second member for the particular skill, the graphical user interface including a first selectable control to endorse the second member for the particular skill and at least a second selectable control to rate a quantified proficiency of the second member in the skill, the endorsement indicating that the first member thinks that the second member possesses the particular skill with a proficiency indicated by the rated quantified proficiency; and
updating the second member profile based upon a selection by the first member of the second selectable control.

9. The computing device of claim 8, wherein the operations further comprise:
responsive to receiving the endorsement of the particular skill from the first member, increasing a calculated skill rank for the second member for the particular skill based upon the rated quantified proficiency.

10. The computing device of claim 9, wherein an amount with which the calculated skill rank for the second member is increased for the particular skill depends on a skill rank of the first member for the particular skill and the rated quantified proficiency.

11. The computing device of claim 10, wherein the operations further comprise:
determining that the first member, based upon the first member profile and the second member profile, is likely to have personal knowledge of the skill of the second member; and
in response, increasing the amount with which the calculated skill rank for the second member is increased for the particular skill.

12. The computing device of claim 11, wherein the operations of determining that the first member is likely to have personal knowledge of the skill of the second member comprises determining one or more of: that the first member is a co-worker of the second member; that the first member is a relative of the second member; and that the first member frequently views a webpage displaying at least a portion of the second member profile.

13. The computing device of claim 8, wherein the operations further comprise:
receiving a search query, the search query requesting a list of members that work for a particular organization and that have endorsed other members who do not work for the particular organization for the particular skill; and
providing the list of members.

14. The computing device of claim 8, wherein the operations comprise notifying the second member that the first member has endorsed them.

15. A non-transitory machine-readable medium comprising instructions, which when executed by a machine causes the machine to perform operations comprising:
receiving an indication that a first user with a first member profile has visited a member profile page of a second user with a second member profile;
selecting at least one particular skill corresponding to the first member profile and the second member profile that is one of a predetermined number of highest ranked skills for both the first and second member, the highest ranked skills based upon the first and second member profiles;
presenting a graphical user interface to the first member, the graphical user interface configured for the first member to include an indication requesting, from the first member, an endorsement of the second member for the particular skill, the graphical user interface including a first selectable control to endorse the second member for the particular skill and at least a second selectable control to rate a quantified proficiency of the second member in the skill, the endorsement indicating that the first member thinks that the second member possesses the particular skill with a proficiency indicated by the rated quantified proficiency; and
updating the second member profile based upon a selection by the first member of the second selectable control.

16. The machine-readable medium of claim 15, wherein the operations further comprise:
   responsive to receiving the endorsement of the particular skill from the first member, increasing a calculated skill rank for the second member for the particular skill based upon the rated quantified proficiency.

17. The machine-readable medium of claim 16, wherein an amount with which the calculated skill rank for the second member is increased for the particular skill depends on a skill rank of the first member for the particular skill and the rated quantified proficiency.

18. The machine-readable medium of claim 17, wherein the operations further comprise:
   determining that the first member, based upon the first member profile and the second member profile, is likely to have personal knowledge of the skill of the second member; and
   in response, increasing the amount with which the calculated skill rank for the second member is increased for the particular skill.

19. The machine-readable medium of claim 18, wherein the quantified proficiency is a numeric proficiency.

20. The machine-readable medium of claim 18, wherein the operations of determining that the first member is likely to have personal knowledge of the skill of the second member comprises determining one or more of: that the first member is a co-worker of the second member; that the first member is a relative of the second member; or that the first member frequently views a webpage displaying at least a portion of the second member profile.

21. The machine-readable medium of claim 15, wherein the operations further comprise:
   receiving a search query, the search query requesting a list of members that work for a particular organization and that have endorsed other members who do not work for the particular organization for the particular skill; and
   providing the list of members.

* * * * *